United States Patent
Tiger

(10) Patent No.: US 9,485,772 B2
(45) Date of Patent: Nov. 1, 2016

(54) TECHNIQUES FOR PEER-TO-PEER NETWORK SHARING

(71) Applicant: FACEBOOK, INC., Menlo Park, CA (US)

(72) Inventor: Roi Tiger, Tel Aviv (IL)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 14/584,116

(22) Filed: Dec. 29, 2014

(65) Prior Publication Data

US 2016/0192344 A1    Jun. 30, 2016

(51) Int. Cl.
  *H04W 72/04* (2009.01)
  *H04L 29/08* (2006.01)
  *H04W 8/18* (2009.01)
  *H04W 88/18* (2009.01)

(52) U.S. Cl.
  CPC .......... *H04W 72/048* (2013.01); *H04L 67/104* (2013.01); *H04W 8/18* (2013.01); *H04W 88/182* (2013.01)

(58) Field of Classification Search
  CPC . H04W 74/04; H04W 72/12; H04W 72/044; H04B 7/0695
  USPC .......... 455/450, 456.2, 456.6, 414.1
  See application file for complete search history.

(56) References Cited

U.S. PATENT DOCUMENTS

| | | | | |
|---|---|---|---|---|
| 2004/0047301 A1* | 3/2004 | Poikselka | ......... | H04L 29/06027 370/261 |
| 2006/0046754 A1* | 3/2006 | Parikh | ................... | H04B 7/2606 455/517 |
| 2009/0046754 A1* | 2/2009 | Kohda | ................... | B82Y 20/00 372/44.01 |
| 2013/0283352 A1* | 10/2013 | Edge | ...................... | H04L 67/16 726/4 |
| 2013/0290755 A1* | 10/2013 | Wolman | ................ | G06F 9/5094 713/320 |
| 2014/0162668 A1* | 6/2014 | Na | ...................... | H04W 72/121 455/450 |
| 2015/0119055 A1* | 4/2015 | Shin | ...................... | H04W 48/12 455/450 |
| 2016/0037569 A1* | 2/2016 | Kim | ...................... | H04W 4/008 455/450 |

* cited by examiner

*Primary Examiner* — Cong Tran

(57) ABSTRACT

Techniques for peer-to-peer network sharing are described. In one embodiment, an apparatus may comprise a sharing control component and a local proxy component. The sharing control component may be operative to transmit an offer from the first mobile device to a second mobile device for the second mobile device to act as a proxy for the first mobile device for the performance of network services in return for a transfer of sharing credit from a first account to a second account with a sharing authority, the first account associated with the first mobile device, the second account associated with the second mobile device, and receive an offer acceptance from the second mobile device. The local proxy component may be operative to receive configuration information and configure the first mobile device to use the second mobile device as a network proxy using the configuration information. Other embodiments are described and claimed.

20 Claims, 13 Drawing Sheets

*800*

```
Transmit an offer from a first mobile device to a second mobile
device for the second mobile device to act as a proxy for the first
mobile device for the performance of network services in return
for a transfer of sharing credit from a first account to a second
account with a sharing authority, the first account associated
with the first mobile device, the second account associated with
              the second mobile device.
                        802
```

```
Receive an offer acceptance from the second mobile device.
                        804
```

```
Receive configuration information and configure the first mobile
device to use the second mobile device as a network proxy using
                the configuration information.
                            806
```

*FIG. 8*

TECHNIQUES FOR PEER-TO-PEER NETWORK SHARING

BACKGROUND

Mobile devices may use a radio network interface to perform data communications, such as to a cellular or Wi-Fi access point. Such data communications may expend the battery power of the mobile device and may incur data communication charges. Cellular data networks may use metered data. The amount of data transferred across a cellular data network may be monitored and debited against a user allocation of data. Similarly, the amount of data transferred across a cellular data network may be monitored and the user billed a fee based on the amount.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for peer-to-peer network sharing. Some embodiments are particularly directed to techniques for peer-to-peer network sharing based on the accrual and expenditure of sharing credits with a sharing authority. In one embodiment, for example, an apparatus may comprise a sharing control component and a local proxy component. The sharing control component may be operative to transmit an offer from the first mobile device to a second mobile device for the second mobile device to act as a proxy for the first mobile device for the performance of network services in return for a transfer of sharing credit from a first account to a second account with a sharing authority, the first account associated with the first mobile device, the second account associated with the second mobile device, and receive an offer acceptance from the second mobile device. The local proxy component may be operative to receive configuration information and configure the first mobile device to use the second mobile device as a network proxy using the configuration information. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 8 illustrates an embodiment of a logic flow for the system of FIG. 1.

DETAILED DESCRIPTION

Figure 1:
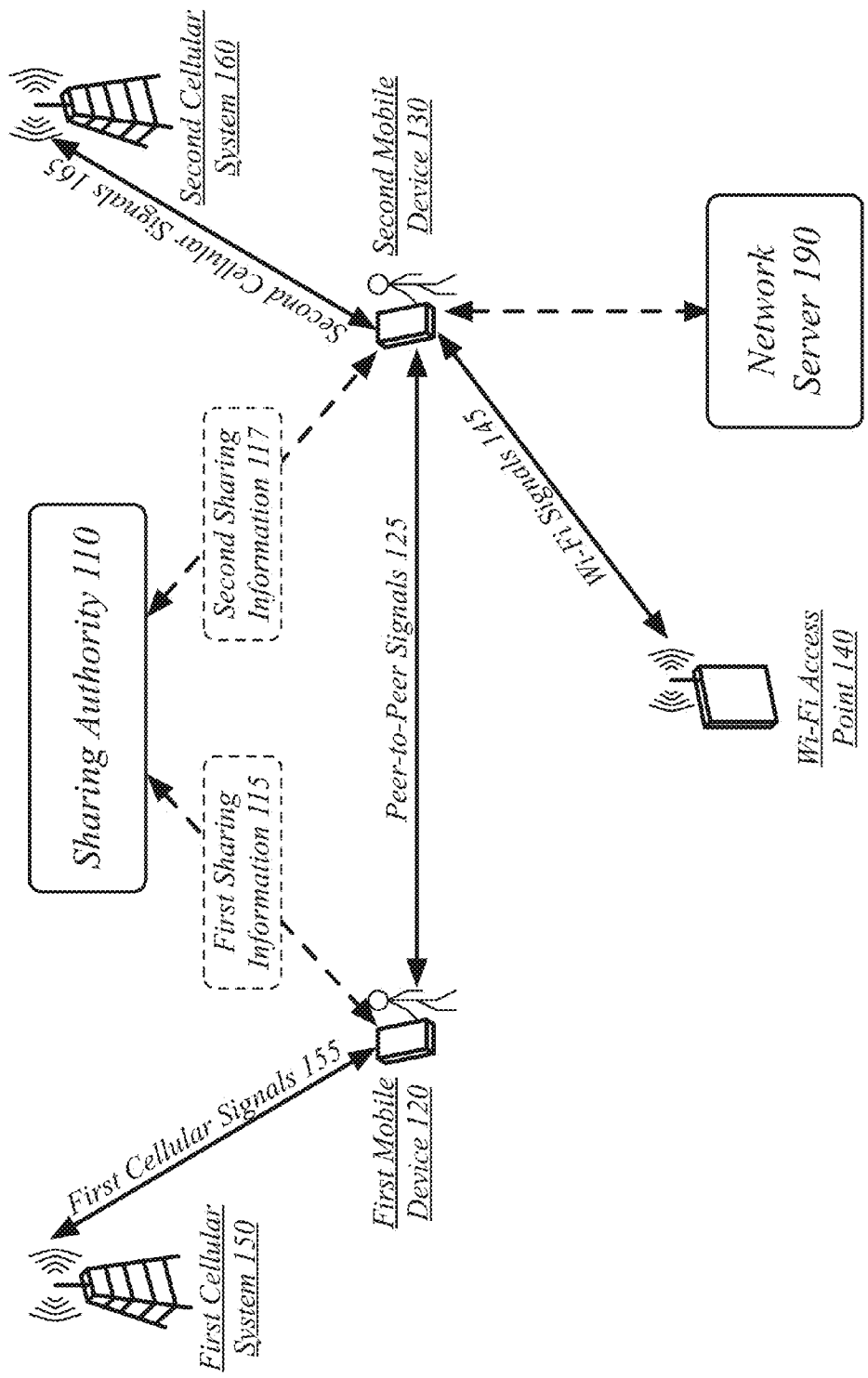
FIG. 1 illustrates an embodiment of a peer-to-peer network sharing system.

Various embodiments are directed to sharing a network connection between mobile devices to extend one device's connection to another. In various situations, one mobile device may be better equipped to perform network activity than another. Without limitation, the mobile device may use a cellular provider providing a better-quality connection in a particular geographic area, the mobile device may have more of its cellular data allocation available, or the mobile device may have a cellular data plan for that geographic area while the other mobile device does not. As such, a mobile device may benefit from being empowered to use another mobile device's network connection.

However, the mobile device sharing its connection may need an incentive to do so. One possible incentive is the reception of credit with a sharing authority managing the networking sharing operations. The user of the sharing mobile device may later be in a situation in which they want to use the network connection of another mobile device, and may therefore be motivated to accrue sharing credits with the sharing authority that the sharing mobile device may use later to benefit from another device sharing its network. Further, in some embodiments, the user of the sharing mobile device may be able to sell its sharing credits to other users of the sharing service if it accumulates more than it expects to need. As a result, users may be motivated to share their network connection, which may make more networks available for use by devices in need of a network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a peer-to-peer network sharing system 100. In one embodiment, the peer-to-peer network sharing system 100 may comprise a computer-implemented system having software applications comprising one or more components. Although the peer-to-peer network sharing system 100 shown in FIG. 1 has a limited number of elements in a certain topology, it may be appreciated that the peer-to-peer network sharing system 100 may include more or less elements in alternate topologies as desired for a given implementation.

A mobile device 120 may communicate with server devices using wireless transmissions to exchange network traffic. Exchanging network traffic, such as may be included in the performance of a user request, may comprise transmitting and receiving network traffic via a network interface controller (NIC). A NIC comprises a hardware component connecting a computer device, such as mobile device 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API)

Mobile devices may comprise a cellular interface for access to cellular systems. Mobile devices may comprise a Wi-Fi interface for access to Wi-Fi access points. Cellular systems may be provided by cellular providers. Users of mobile devices may need to have cellular data subscriptions or purchase pre-paid cellular data in order to access a cellular system. Wi-Fi access points may be provided by a plurality of different operators. Some of the Wi-Fi access points may be personal in nature, such as a home Wi-Fi network operated by the user of a mobile device based on a domestic Internet connection. Some of the Wi-Fi access points may be provided by business entities providing free, complimentary, or pay Wi-Fi access in the public sphere.

A first mobile device 120 may use first cellular signals 155 to access first cellular system 150. The first cellular system 150 may be provided by a cellular provider with which the user of the first mobile device 120 has a cellular data subscription or pre-paid cellular data allocation for the first mobile device 120. A second mobile device 130 may use second cellular signals 165 to access second cellular system 160. The second cellular system 160 may be provided by a cellular provider with which the user of the second mobile device 130 has a cellular data subscription or pre-paid cellular data allocation for the second mobile device 130.

The user of the first mobile device 120 may have one or more motivations for not using the first cellular system 150 or for limiting their use of the first cellular system 150. In a first case, the first cellular system 150 may offer poor performance to the first mobile device 120 in a current context: it may be suffering technical problems, it may offer poor service to an area in which the first mobile device 120 is current operating, etc. In a second case, a cellular data allocation for the first mobile device 120 from a cellular data subscription or pre-paid cellular data purchase may be running low. In a third case, the first mobile device 120 may not have a cellular data allocation with the first cellular system 150 and therefore be paying, for example, per-kilobyte or per-megabyte charges. One or more of these cases may be combined and other cases in which the user of the first mobile device 120 is motivated to limit or avoid use of the first cellular system 150 may exist. The user may be willing to use the first cellular system 150 to exchange first sharing information 115 with a sharing authority 110 in order to set up network sharing with a local mobile device, but may desire to avoid using the first cellular system 150 for any other operations.

The user of the second mobile device 130 may have one or more advantages with regards to a network connection as compared to other mobile users. In a first case, the second cellular system 160 used by the second mobile device 130 may offer superior performance to other cellular systems providing service to the area: a more reliable connection, a higher bandwidth connection, a lower-latency connection, etc. In a second case, the second mobile device 130 may have a cellular data allocation for a geographic area in which the second mobile device 130 is operating while nearby mobile devices do not. In a third case, the second mobile device 130 may have access to a Wi-Fi access point 140 unavailable to at least some other mobile devices.

In a fourth case, a cellular data allocation for the second mobile device 130 from a cellular data subscription or pre-paid cellular data purchase may have a significant amount remaining. In particular, the cellular data allocation may be time-limited, as is common with a cellular data subscription, expiring at the end of a monthly billing period with a new allocation provided in the new billing period. As such, the second mobile device 130 may have cellular data allocation that a usage history for the device indicates will not be used solely based on the behavior of the second mobile device 130. The sharing authority 110 (which may include the support of a local application on the second mobile device 130) may analyze the usage history of the second mobile device 130, compare it to a remaining cellular data allocation for the second mobile device 130, and determine that a prediction of future usage based on the usage history indicates that cellular data allocation will remain—and be wasted—at the end of a billing period. The sharing authority 110 may therefore promote network sharing to the second mobile device 130 in response to this determination along with a notification of the prediction of wasted cellular data allocation.

In some cases, the second mobile device 130 may initiate an exchange of second sharing information 117 with the sharing authority 110 to determine whether any opportunities exist to gain sharing credits by sharing its network connection. For example, where a local application on the second mobile device 130 determines that excess cellular data allocation is predicted to exist for the second mobile device 130, the local application may—in some embodiments, after consultation with the user of the device—inquire as to sharing opportunities to make use of the excess cellular data allocation. In other cases, the sharing authority 110 may initiate an exchange of second sharing information 117 with the second mobile device 130 to determine whether the second mobile device 130 will share its network connection in return for sharing credit. For example, the sharing authority 110 may receive a request from another mobile device to benefit from a shared connection and contact devices in the proximity of the other mobile device to determine whether any are in a position to and have an interest in sharing their connection.

Sharing a network connection between a first mobile device 120 and a second mobile device 130 may include the exchange of peer-to-peer signals 125. Peer-to-peer signals 125 may comprise the direct exchange of radio transmission between the two mobile devices 120, 130 without the use of an intermediary transceiver distinct from the devices. The peer-to-peer signals 125 may conform to a peer-to-peer protocol such as Wi-Fi Direct or Bluetooth. The peer-to-peer signals 125 may comprise one of the first and second mobile devices 120, 130 connecting to a Wi-Fi hotspot created by the other of the first and second mobile devices 120, 130. The peer-to-peer signals 125 may conform to any known technique for generating a peer-to-peer radio connection. The peer-to-peer signals 125 may empower the first mobile device 120 to use the second mobile device 130 as a proxy to access Internet resources. For example, the first mobile device 120 may communicate with a network server 190 using the second mobile device 130 as a proxy.

In some embodiments, peer-to-peer signals 125 may be used for the discovery of mobile devices willing to share their connection and mobile devices interested in benefiting from a shared connection. Various known techniques for local discovery may be used, including Wi-Fi techniques and Bluetooth techniques. In some embodiments, a second mobile device 130 interested in receiving sharing credit in return for providing network sharing may create a Wi-Fi hotspot, with a broadcast name of the Wi-Fi hotspot containing an identifier for its participation in the peer-to-peer network sharing system 100 and allowing limited connections for the purpose of negotiating a credit-for-sharing agreement.

The use of solid lines for the first cellular signals 155, second cellular signals 165, first Wi-Fi signals 145, second Wi-Fi signals 147, and peer-to-peer signals 125 may indicate that these signals comprise direct wireless communication between the depicted entities. For example, the first cellular signals 155 may be transmitted by the first mobile device 120 and received by a transceiver of the first cellular system 150, and vice-versa, and similarly for the other signals depicted with solid lines. In contrast, the use of dashed lines may indicate that while communication is between the connected entities that the entities may not be communicating without the involvement of other entities. For instance, first sharing information 115 may be communicated between the first mobile device 120 and the sharing authority 110, but relayed through the first cellular system 150. Similarly, second sharing information 117 may be communicated between the second mobile device 130 and the sharing authority 110, but be relayed through the second cellular system 160 or Wi-Fi access point 140.

The mobile devices 120, 130 and/or the sharing authority 110 may use knowledge generated from interactions in a social-networking service. As such, peer-to-peer network sharing system 100 may include an authorization server (or other suitable component(s)) that allows users to opt in to or opt out of having their actions logged by the peer-to-peer network sharing system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the peer-to-peer network sharing system 100 and other elements of a social-networking system through blocking, data hashing, anonymization, or other suitable techniques as appropriate.

Figure 2:
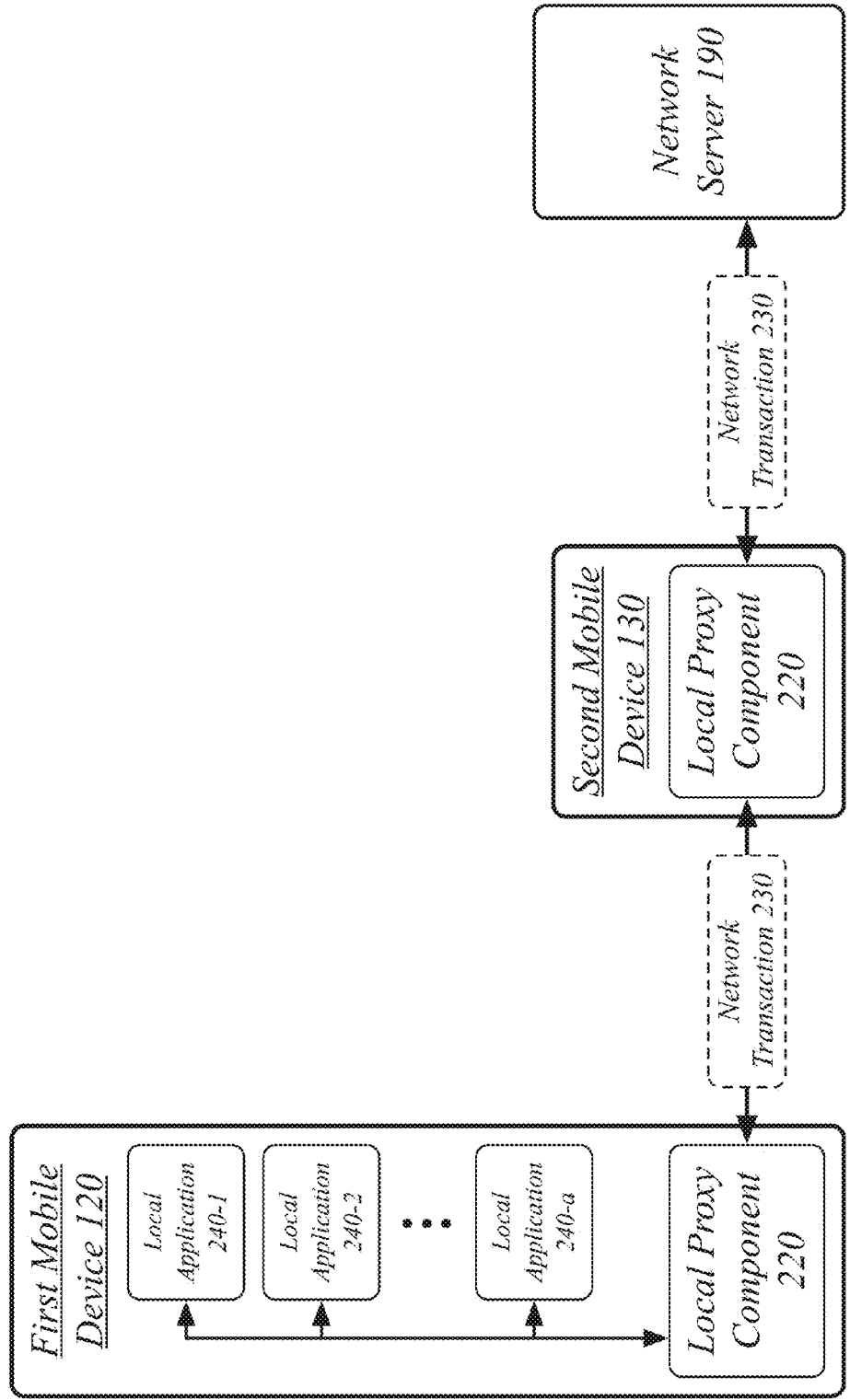
FIG. 2 illustrates an embodiment of a network transaction in the peer-to-peer network sharing system.

FIG. 2 illustrates an embodiment of a network transaction 230 in the peer-to-peer network sharing system 100.

The mobile devices 120, 130 may execute local applications on behalf of a user of the devices. The first mobile device 120 may execute local applications 240. The local applications 240 may comprise one or more networked applications that may use network activity as part of their operation. One or more of the local applications 240 may comprise web browsers.

The first mobile device 120 and second mobile device 130 may both comprise a local proxy component 220. The local proxy component 220 may be registered with an operating system (OS) of first and second mobile devices 120, 130 to act as a network interface for the first and second mobile devices 120, 130. The first and second mobile devices 120, 130 may include a plurality of network interfaces, such as a cellular network interface, a Wi-Fi network interface, a Bluetooth network interface, and any other known network interfaces. These network interfaces may be categorized and prioritized for use with various apps running on the first and second mobile devices 120, 130. The local proxy component 220 may be configured as a default network interface for local applications, such that the local proxy component 220 is used in preference over the cellular network interface, Wi-Fi network interface, or any other network interface. The local proxy component 220 may then select from among the other network interfaces of the first and second mobile devices 120, 130 for the transmission and reception of network traffic out of the first and second mobile devices 120, 130 and reception of network traffic into the first and second mobile devices 120, 130, transmitting and receiving across one or more of the other network interfaces of the first and second mobile devices 120, 130 that provide external network connectivity. The local proxy component 220 may thereby serve as a gateway between the local applications 240 and the one or more external networks to which the first and second mobile devices 120, 130 can connect. By serving as a gateway, the local proxy component 220 may be operative to perform communication requests on behalf of local applications 240.

Submitting a communication request to the local proxy component 220 may comprise using a network interface application programming interface (API) generally providing access to networks accessible to the devices. For instance, the operating system of the first and second mobile devices 120, 130 may automatically select a network interface from a plurality of network interfaces according to a priority of the network interfaces. The local proxy component 220 may be the highest-priority network interface of the plurality of network interfaces. In some embodiments, local applications 240 using local proxy component 220 may first be registered with the operating system or local proxy component 220 before the local proxy component 220 is a prioritized network interface for the local applications 240. A user of a mobile device may have to opt-in to a privacy policy associated with local proxy component 220 prior to local proxy component 220 being used as a network interface for local applications 240.

Any or all of local applications 240 may submit communication requests to the local proxy component 220. Any of the communication requests of any of the local applications 240 may comprise a network transaction 230 carried out by the local proxy component 220 of the first mobile device 120 using the local proxy component 220 of the second mobile device 130 as a proxy to communicate with a network server 190.

The local proxy component 220 of the first mobile device 120 may receive a network request from one of the local applications 240 executed by the first mobile device 120.

The local proxy component 220 of the first mobile device 120 may transmit the network request to the local proxy component 220 of the second mobile device 130. The local proxy component 220 of the second mobile device 220 may then forward the network request to the network server 190 to which it is addressed. If the network server 190 responds, the response may be transmitted by the network server 190 to the local proxy component 220 of the second mobile device 130. The local proxy component 220 of the second mobile device 130 may then forward the response to the local proxy component 220 of the first mobile device 120. The local proxy component 220 of the first mobile device 120 may then provide the response to the application of the local application 240 that initiated the network request. All of this exchange may comprise a network transaction 230 carried out. The local proxy component 220 of the first mobile device 120 may generally operate as a local proxy for the local applications 240 of the first mobile device 120. The local proxy component 220 of the second mobile device 130 may generally operate as a remote proxy for the first mobile device 120.

Figure 3:
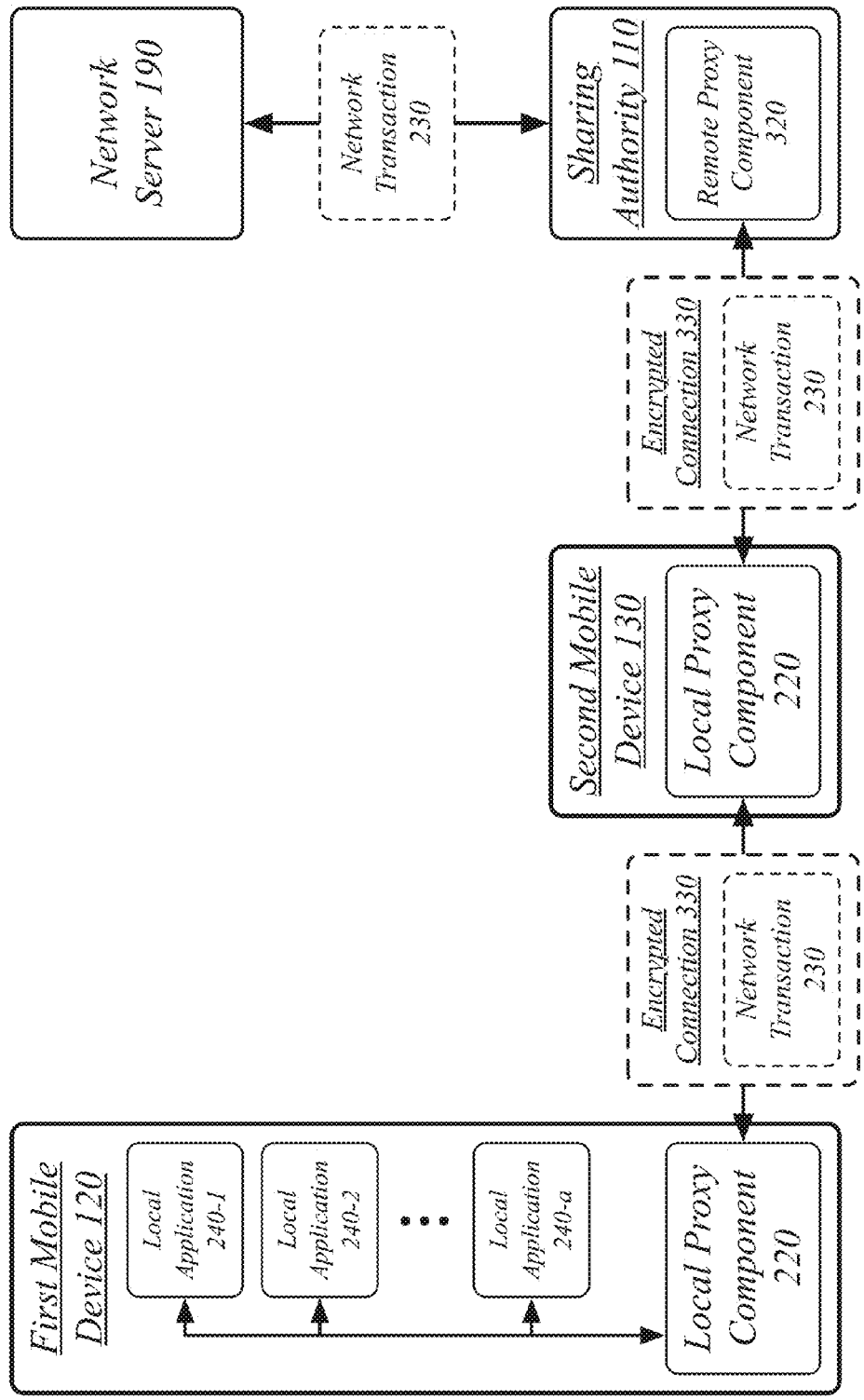
FIG. 3 illustrates an embodiment of an encrypted transaction in the peer-to-peer network sharing system.

FIG. 3 illustrates an embodiment of an encrypted connection 330 in the peer-to-peer network sharing system 100.

Where the network transaction 230 described with reference to FIG. 2 uses end-to-end encryption between the first mobile device 120 and the network server 190, the second mobile device 130 may be unable to snoop on the contents of the network transaction 230. However, many network transactions may be unencrypted. A user of the first mobile device 120 may have some comfort in performing unencrypted network activity using the cellular system 130 because it may have a trust relationship with the operator of the cellular system 130. However, the user of the second mobile device 130 may be unknown to the user of the first mobile device 120 and the user of the first mobile device 120 may not be willing to extend any trust to the user of the second mobile device 130. As such, the user of the first mobile device 120 may benefit from having the network transaction 230 tunneled through an encrypted connection 330.

The user of the first mobile device 120 may have a trust relationship with the sharing authority 110. The user of the first mobile device 120 may be willing to allow the sharing authority 110 to process an unencrypted network transaction 230 on its behalf. As such, the local proxy component 220 of the first mobile device 120 may established an encrypted connection 330 with a remote proxy component 320 for the sharing authority 110, such as a remote proxy component 320 executed by a proxy server device for the sharing authority 110. Various techniques for establishing an encrypted connection 330 may be used, including, without limitation, virtual private network (VPN) techniques, private/public encrypted techniques using a public key for the sharing authority 110 known to the local proxy component 220, or any other known technique for creating an encrypted connection 330 being transmitted via an untrusted intermediary such as the second mobile device 130.

The local proxy component 220 of the first mobile device 120 may establish an encrypted connection 330 between the local proxy component 220 and the remote proxy component 320. The encrypted connection 330 may be retransmitted via the local proxy component 220 of the second mobile device 130 but without the local proxy component 220 able to decrypt the contents of the encrypted connection 330. The encrypted connection 330 may carry the network transaction 230 described with reference to FIG. 2 within it, with the remote proxy component 320 performing the unencrypted network transaction 230 with the network server 190 as a proxy for the first mobile device 120.

Figure 4:
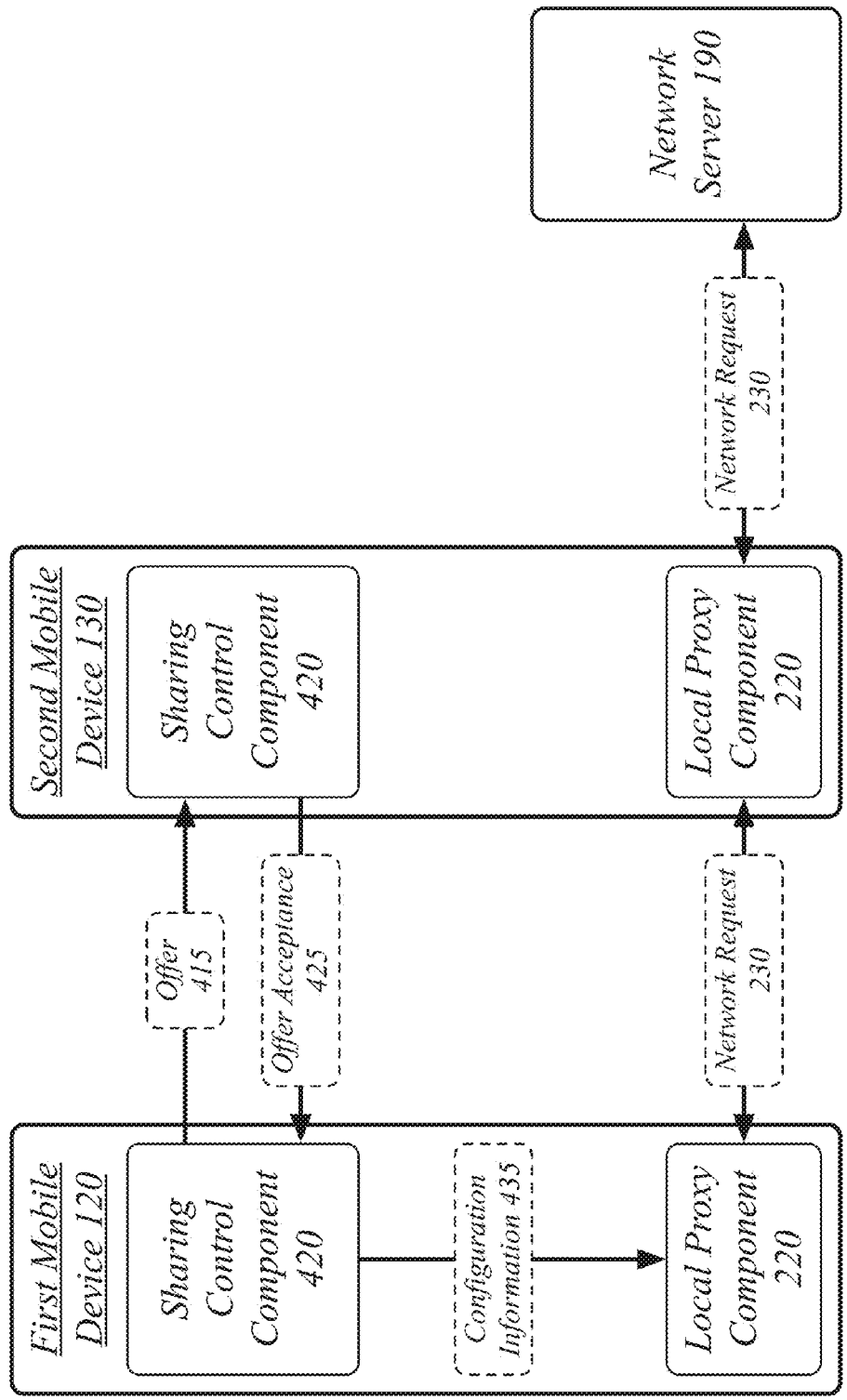
FIG. 4 illustrates an embodiment of an offer and acceptance exchange in the peer-to-peer network sharing system.

FIG. 4 illustrates an embodiment of an offer 415 and offer acceptance 425 exchange in the peer-to-peer network sharing system 100.

The sharing operations for a mobile device within the peer-to-peer sharing system 100 may be managed locally on each mobile device by a sharing control component 420. The sharing control component 420 may be generally arranged to manage both the providing and reception of network sharing and to communicate with a user of the device as to control over the providing and reception of network sharing. Each of the first and second mobile devices 120, 130 may execute an instantiation of the sharing control component 320. In some embodiments, the sharing control component 420 and the local proxy component 220 may be part of a local gateway application on the mobile devices 120, 130.

The sharing control component 420 on the first mobile device 120 may transmit an offer 415 from the first mobile device 120 to the second mobile device 130. The offer 415 may be for the second mobile device 130 to act as a proxy for the first mobile device 120 for the performance of network services in return for a transfer of sharing credit from a first account to a second account with a sharing authority 110. This first account may be associated with the first mobile device 120 and this second account associated with the second mobile device 130. Users of each of the first and second mobile devices 120, 130 may have registered their respective mobile devices with their respective accounts with the sharing authority 110. The sharing control component 420 may receive an offer acceptance 425 from the sharing control component 420 of the second mobile device 130.

In some embodiments, the first and second mobile devices 120, 130 may communicate directly using peer-to-peer signals 125. In other embodiments, the first and second mobile devices 120, 130 may communicate via the sharing authority 110. In some embodiments, the offer 415 may be evaluated according to sharing criteria for the second mobile device 130 registered with the sharing authority 110, the sharing criteria comprising at least a portion of the sharing information 117. For example, the second mobile device 130 may register the minimum amount of sharing credit it is willing to accept for providing sharing services to other mobile devices, with the offer 415 compared to this minimum amount to determine whether the offer is acceptable. In some embodiments, the offer acceptance 425 may be performed automatically by the sharing authority 110 in response to an offer 415 meeting the minimum acceptance criteria for the second mobile device 130. In other embodiments, an offer 415 meeting the minimum acceptable criteria for the second mobile device 130 may still be forwarded to the second mobile device 130 in order to determine whether the sharing control component 420 still believes that the second mobile device 130 is an appropriate state to performing network sharing (e.g., sufficient network bandwidth, sufficient power, etc.) and/or to receive approval from a user of the second mobile device 130.

The offer acceptance 425 may be received from the second mobile device 130 in response to a prediction by the second mobile device 130 that a cellular data allocation for cellular data service for the second mobile device 130 has excess capacity for an allocation period. Such a prediction may also be used by the second mobile device 130 to initiate advertising of proxying availability to other devices and through the sharing authority 110.

In response to the offer acceptance 425, the local proxy component 220 of the first mobile device 120 may receive configuration information 435 from the sharing control component 420 and configure the first mobile device 120 to use the second mobile device 130 as a network proxy using the configuration information 435. The configuration information 435 may be received as part of the offer acceptance 425. The configuration information 435 may include information for establishing a peer-to-peer connection comprising peer-to-peer signals 125. The first mobile device 120 using the second mobile device 130 as a proxy may comprise, without limitation, at least one of the first mobile device 120 connecting to a Wi-Fi hotspot created by the second mobile device 130, the first mobile device 120 creating a Wi-Fi hotspot at the first mobile device 120 for the second mobile device 130 to connect to, creating a direct Wi-Fi connection between the first mobile device 120 and the second mobile device 130, and creating a Bluetooth connection between the first mobile device 120 and the second mobile device 130.

The sharing control component 420 may prompt the user of the first mobile device 120 that they may wish to use a proxy for network access based on a variety of criteria. The sharing control component 420 may determine that a cellular data allocation for a cellular data account for the first mobile device 120 is below a threshold amount and display a notification of available sharing services to the user of the first mobile device 120 in response to determining that the cellular data allocation for the cellular data account for the first mobile device is below the threshold amount. The sharing control component 420 may determine that the first mobile device 120 does not have a cellular data allocation for a geographic region in which the first mobile device 120 is operating and display a notification of available sharing services to a user of the first mobile device 120 in response to determining that the first mobile device 120 does not have the cellular data allocation for the geographic region in which the first mobile device 120 is operating. The sharing control component 420 may determine that the second mobile device 130 has a higher-quality network connection available than the first mobile device 120 and display a notification of available sharing services to a user of the first mobile device 120 in response to determining that the second mobile device 130 has the higher-quality network connection available. In some cases, multiple of these determinations may be made and displayed to the user of the first mobile device 120 in combination with each other. These determinations may be displayed in association with a sharing credit amount asked by the second mobile device 130 and/or a reliability rating for the second mobile device 130.

In some cases, the offer 415 may be transmitted as part of an auction held for a receipt of network proxy services from the second mobile device 130. The sharing authority 110 may determine that multiple devices proximate to a second mobile device 130 would like to receive the benefit of proxy services from the second mobile device 130, the number of proximate mobile devices in excess of a number appropriate to receiving proxy services from the second mobile devices 130. The sharing authority 110 may therefore initiate an auction among the multiple proximate mobile devices to bid for the services of the second mobile device 130. The sharing authority 110 may select one or more proximate mobile devices with the highest bid(s), notify the second mobile device 130, with the offer acceptance 425 comprising an acceptance of a bid corresponding to the offer 415. In some embodiments, the auction may comprise multiple rounds of bidding. Any known techniques for auctions may be used, including Vickrey auctions.

Figure 5:
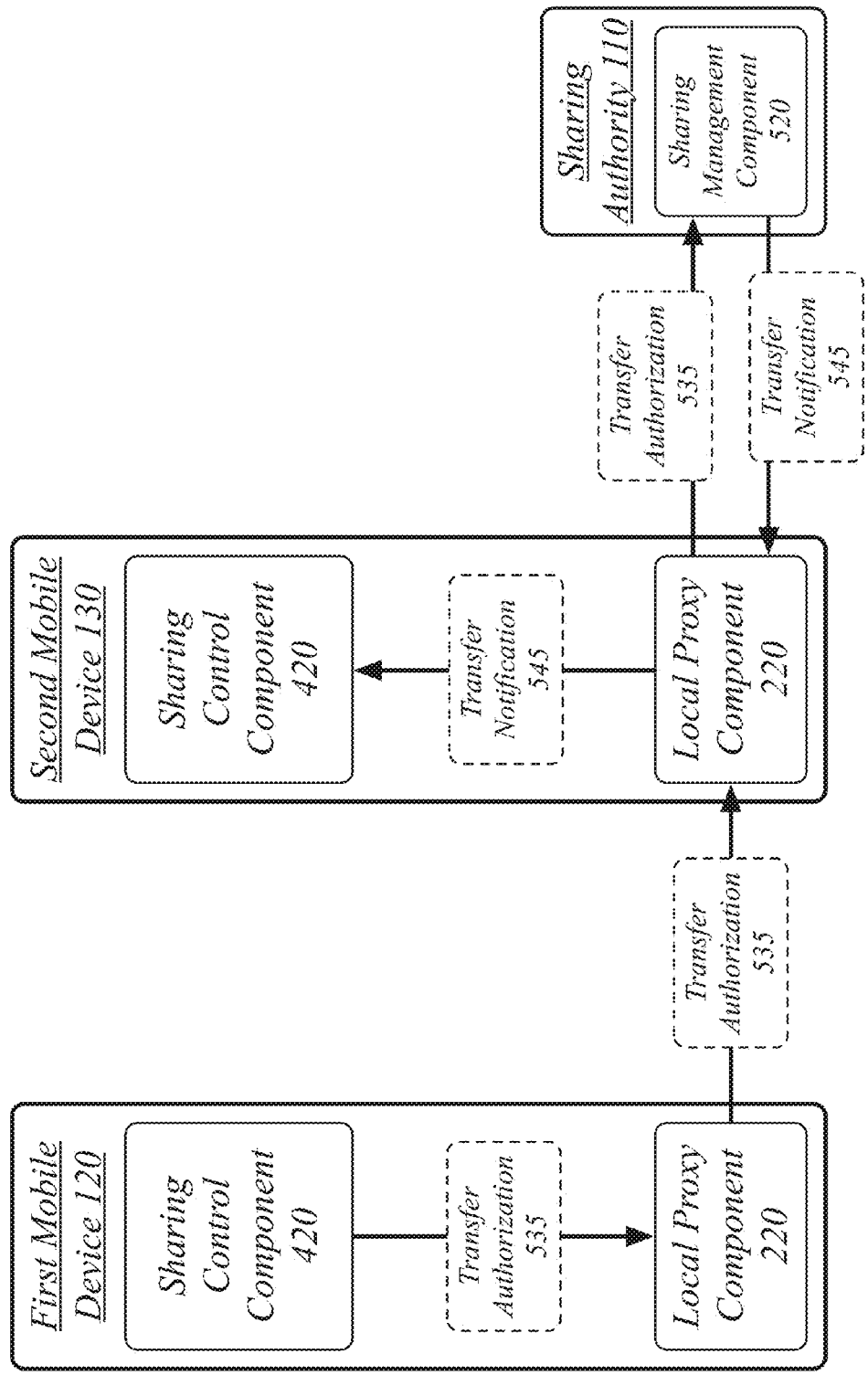
FIG. 5 illustrates an embodiment of a sharing credit transfer authorization in the peer-to-peer network sharing system.

FIG. 5 illustrates an embodiment of a sharing credit transfer authorization 535 in the peer-to-peer network sharing system 100.

The user of the first mobile device 120 may transfer sharing credit from their user account to a user account for the user of the second mobile device 130 in order to compensate the user of the second mobile device 130 for the user of their mobile device and their network connection. The sharing control component 430 may authorize the transfer of sharing credit from the first account to the second account with the sharing authority 110 using security credentials for the first account. Using security credentials may comprise encrypting at least a portion of the transfer authorization 535 with the security credentials (e.g., a private key) to prove that the sharing control component 420 for the first mobile device 120 has authorized the transfer.

In some cases, the transfer authorization 535 may be transmitted to the sharing authority 110 using the proxy provided by the second mobile device 130. In other cases, such as where the second mobile device 130 refuses to offer proxy services until compensated, the transfer authorization 535 may be transmitted without use of the second mobile device 130, such as through the first cellular system 150. In some cases, the second mobile device 130 may allow through connections to a sharing management component 520 of the sharing authority 110 to allow the performance of the transfer authorization 535. This may serve to minimize or eliminate the use of a network connection to the Internet for the first mobile device 120 other than the one provided by the second mobile device 130.

Sharing credit may be represented with the sharing authority 110 according to a variety of schema. Each account with the sharing authority 110 may have associated with a delineated quantity of sharing credits that the user has accumulated with the sharing authority 110. In one case, the sharing credit used by the first mobile device 110 to pay for the sharing services of the second mobile device 110 may have been generated with the sharing authority 110 based on a previous session of the first mobile device 120, wherein the first mobile device 120 provided network proxy services to a third mobile device in the previous session. In another case, the user of the first mobile device 110 may have purchased the sharing credit using money. In some embodiments, the user may be able to purchase sharing credits created by the sharing authority 110. In other embodiments, the user may only be able to purchase sharing credits from another user of the sharing authority 110 via the sharing authority 110 so as to reduce inflation of sharing credits. In general, the sharing authority 110 may be empowered to manage a market for sharing credits.

In some embodiments, the sharing authority 110 may contribute sharing credits to a user's account, or contribute part of a sharing cost for using a second mobile device 130, based on the user of the first mobile device 120 viewing advertisements. In some of these embodiments, the advertisements may be inserted into the network activity performed by the second mobile device 130 on behalf of the first mobile device 110, so as to be viewed during the receipt of proxy services. For example, the user of the first mobile device 120 may be displayed advertisements provided by the sharing authority 110 during a web browsing session carried out during the proxy services, the advertisements inserted into the web browsing session by the sharing authority 110 in return for the sharing authority 110 paying at least a portion of the sharing credits paid to the user account of the second mobile device 130.

Sharing credits may be paid according to a variety of schema. An offer and acceptance of sharing credits may be for a specific amount of sharing credits in return for a specific amount of time, a specific amount of bandwidth, or according to some other measure of network usage. In some cases, the offer and acceptance may be for a certain amount of sharing credit for each unit of time (e.g., minute, 5 minute period, etc.) or bandwidth (e.g., KB, MB, GB) used. It will be appreciated that the peer-to-peer network sharing system 100 may offer a variety of sharing agreements that may be entered into by users.

The sharing authority 110 may transmit a transfer notification 545 to the second mobile device 130, the transfer notification 545 authenticating to the second mobile device 130 that the first user account for the first mobile device 120 has transferred the agreed-to sharing credits to the second user account. Where increments of time are purchased, a series of transfer authorizations and transfer notifications may be used to maintain authorization for credit transfer and to provide notice of the transfer so as to keep the shared connection available to the first mobile device 120.

Figure 6:
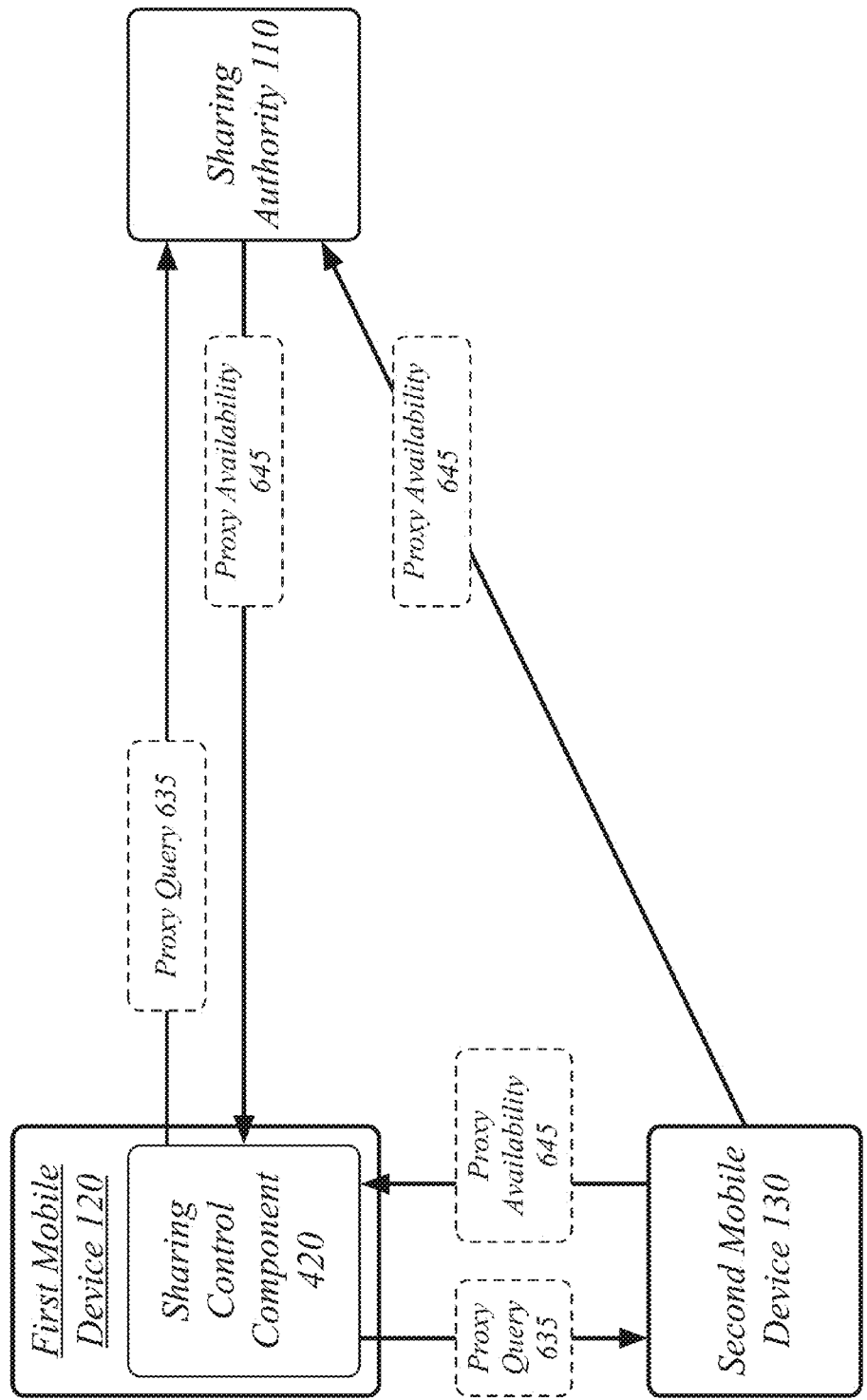
FIG. 6 illustrates an embodiment of a proxy query in the peer-to-peer network sharing system.

FIG. 6 illustrates an embodiment of a proxy query in the peer-to-peer network sharing system 100.

The sharing control component 420 may identify that the user of the first mobile device 120 may benefit from receiving proxy services to share a network connection of another device. The sharing control component 420 identifying this possibility may comprise a determination of a poor network connection for the first mobile device 120, a determination that the network connection for the first mobile device 120 is using a cellular system 130 for which the first mobile device 120 has little cellular data allocation remaining, a determination that the network connection for the first mobile device 120 is using a cellular system 130 for which the first mobile device 120 has no cellular data allocation, or according to any other indication that the user may benefit from a network proxy provided by a nearby mobile device. In some cases, the user of the first mobile device 120 may manually request that a proxy be found.

The sharing control component 420 may perform a proxy query 635 in response to the identification. The sharing control component 420 may receive a proxy availability 645 notification in response. In some cases, the proxy query 635 may be performed with the sharing authority 110. The sharing control component 420 may receive a proxy availability 645 notification for the second mobile device 120 from the sharing authority 110 at the first mobile device 120, the proxy availability 645 notification comprising connection information for transmitting an offer 415 to the second mobile device 130. The proxy availability 645 received from the sharing authority 110 may have been initially provided to the sharing authority 110 from the second mobile device 130 as at least part of the second mobile device 130 advertising its willingness to provide proxy services. Alternatively, in some cases, the sharing control component 420 may broadcast a proxy query 635 locally and receive the proxy availability 645 directly from the second mobile device 130 in response. Alternatively, in other cases, the second mobile device 130 may broadcast the proxy availability 645 locally without being prompted by the first mobile device 120 to advertise its willingness to provide proxy services in return for sharing credit.

The sharing authority 110 may select a particular second mobile device 120 according to a variety of criteria. For instance, the first mobile device 120 may specify an amount it is willing to pay and the second mobile device 130 may specify an amount it demands to be paid. The proxy availability 645 may comprise only those mobile devices that would accept the amount the first mobile device 120 would be willing to pay. The proxy query 635 may comprise a location of the first mobile device 120 to inform the sharing authority 110 of what location mobile devices must be in for it to be able to receive their services. Similarly, a proxy availability 645 transmitted to the sharing authority 110 by the second mobile device 130 may comprise a location of the second mobile device 130 to information the sharing authority 110 of what location it can provide network sharing in.

In some cases, the second mobile device 130 may be selected according to an available amount of cellular data allocation for a cellular data account for the second mobile device 130. The sharing authority 110 may be operative to direct a first mobile device 120 to a second mobile device 130 with the most or a particularly large amount of cellular data allocation remaining. The sharing authority 110 may, for example, be willing to ask a user with a particularly large amount of cellular data allocation remaining whether they would accept a bid for sharing credit in return for receiving proxy services that is below their normal threshold due to the extent of the cellular data allocation remaining. Similarly, where a second mobile device 130 has not specified an amount demanded, the sharing authority 110 may ask the user of the second mobile device 130 whether they would be interested in sharing their network connection in return for sharing credit based on the extent of their cellular data allocation remaining.

The proxy query 635 may comprise a query by the first mobile device 120 to the second account for a sharing credit amount asked for acting as a proxy. Upon receiving the proxy availability 645, the sharing control component 420 may display the sharing credit amount asked to a user of the first mobile device 120 in association with a notification of available sharing services. The sharing control component 420 may receive a user selection to initiate the available sharing services in response to the displaying notification of available sharing services displayed in association with the sharing credit amount.

In some cases, the sharing authority 110 may include mobile devices that are out of range of the first mobile device 120 but that are close enough to be in range if the first mobile device 120 were to travel a short distance. For example, the user of the first mobile device 120 may be willing to move to a different location in an airport while waiting for a flight in order to receive network services from a second mobile device 130. The sharing authority 110 may be operative to guide or instruct the user of the first mobile device 120 as to where to go to be within range of the second mobile device 130.

Figure 7:
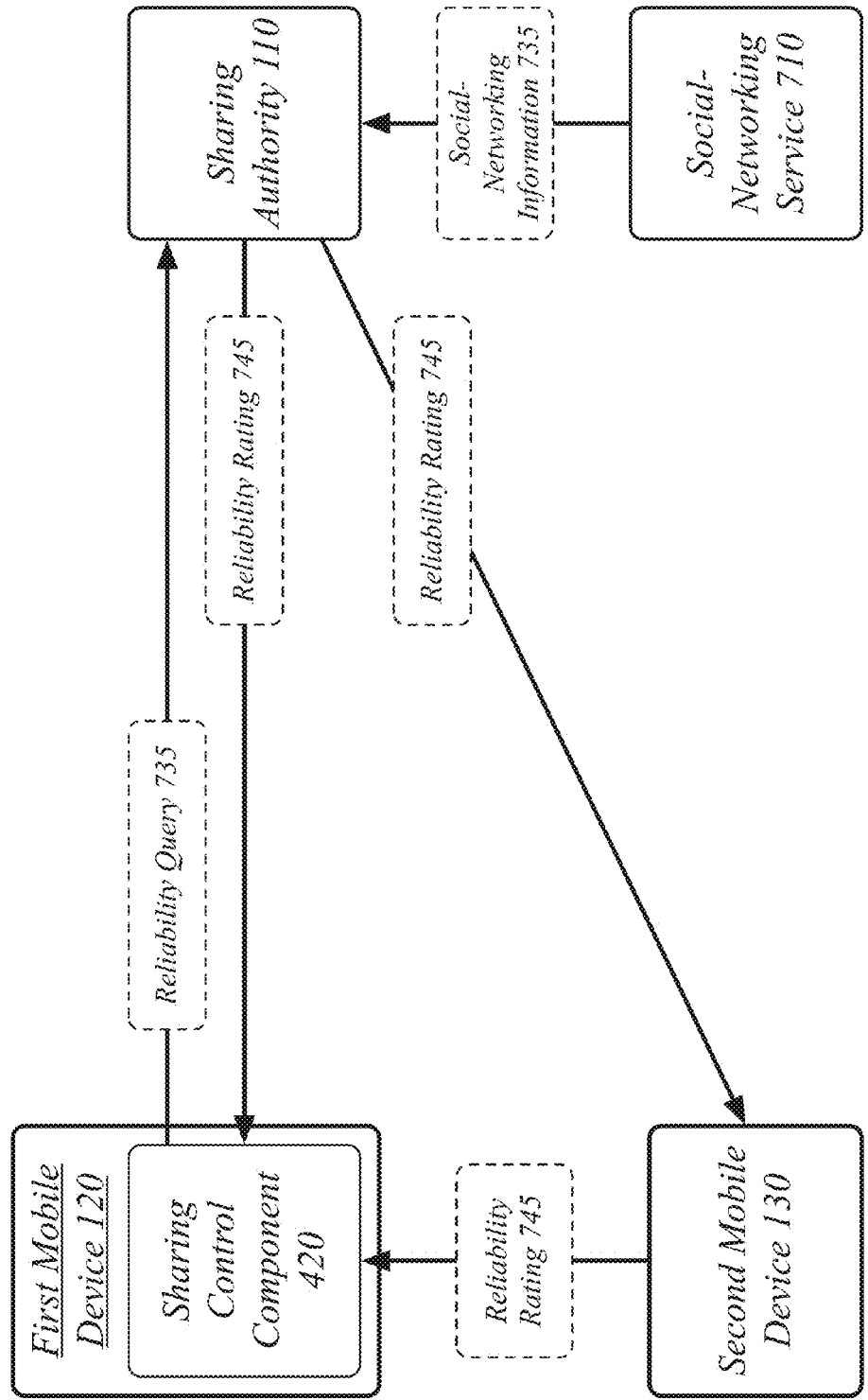
FIG. 7 illustrates an embodiment of a reliability query in the peer-to-peer network sharing system.

FIG. 7 illustrates an embodiment of a reliability query 735 in the peer-to-peer network sharing system 100.

In some cases, the sharing system 100 may generate and provide a reliability rating 745 for users of the peer-to-peer networking sharing system 100. The reliability rating 745 for a user account may represent a reliability of a user of the second account in providing proxy services. The reliability rating 745 may be based on previous proxy services provided by the second mobile device 130, such as whether the second mobile device 130 reliably performs proxy services for other devices. The reliability rating 745 may include an evaluation of the network connection of the second mobile device 130. The sharing control component 420 of the first mobile device 120 may therefore query the sharing authority 110 for a reliability rating 745 of the second account and receive the reliability rating 745 of the second account from the sharing authority 110. The sharing control component 420 may display the reliability rating 745 to a user of the first mobile device 120 in association with a notification of available sharing services and receive a user selection to initiate the available sharing services based on the notification that included the reliability rating 745.

In some embodiments, the reliability rating 745 may be generated based at least in part on social-networking information 735 for the user of the second account from a social-networking service 710. A social-networking service 710 may have access to significant information regarding the reliability of a user. The social-networking service 710 may be able to evaluate the reliability of a user in a broader social context apart from network services provided by the second mobile device 130. The social-networking information 735 may be combined with reliability information generated from the providing of proxy services by the second mobile device 130 to generate the reliability rating 745.

In some cases, the reliability rating 745 may be received by the first mobile device 120 from the second mobile device 130 over a peer-to-peer connection. The reliability rating 745 may be digitally signed by the sharing authority 110 to verify the sharing authority 110 as the source of the reliability rating 745. The second mobile device 130 may be empowered to cache the digitally signed reliability rating 745 and to provide it to other devices so as to advertise its reliability without requiring a round trip to the sharing authority 110. The digitally signed reliability rating 745 may include a timestamp to allow the sharing control component 420 of the first mobile device 120 to verify that the reliability rating 745 is sufficiently recent.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 8 illustrates one embodiment of a logic flow 800. The logic flow 800 may be representative of some or all of the operations executed by one or more embodiments described herein.

In the illustrated embodiment shown in FIG. 8, the logic flow 800 may transmit an offer 415 from a first mobile device 120 to a second mobile device 130 for the second mobile device 130 to act as a proxy for the first mobile device 120 for the performance of network services in return for a transfer of sharing credit from a first account to a second account with a sharing authority 110, the first account associated with the first mobile device 120, the second account associated with the second mobile device 130 at block 802.

The logic flow 800 may receive an offer acceptance 425 from the second mobile device 130 at block 804.

The logic flow 800 may receive configuration information 435 and configure the first mobile device 120 to use the second mobile device 130 as a network proxy using the configuration information 435 at block 806.

The embodiments are not limited to this example.

Figure 9:
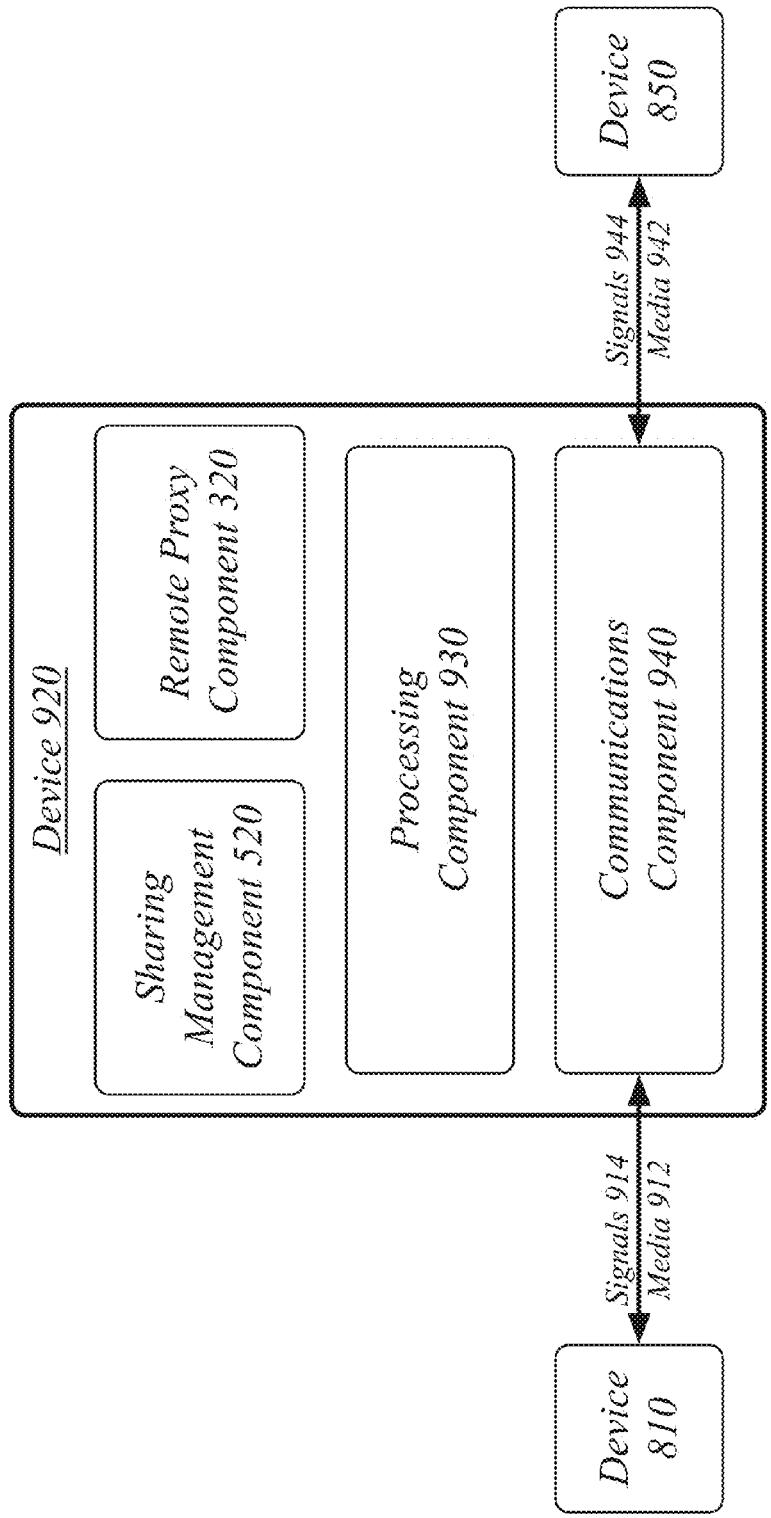
FIG. 9 illustrates an embodiment of a centralized system for the system of FIG. 1.

FIG. 9 illustrates a block diagram of a centralized system 900. The centralized system 900 may implement some or all of the structure and/or operations for the peer-to-peer network sharing system 100 in a single computing entity, such as entirely within a single device 920.

The device 920 may comprise any electronic device capable of receiving, processing, and sending information for the peer-to-peer network sharing system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 920 may execute processing operations or logic for the peer-to-peer network sharing system 100 using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 920 may execute communications operations or logic for the peer-to-peer network sharing system 100 using communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 912, 942 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 920 may communicate with other devices 910, 950 over a communications media 912, 942, respectively, using communications signals 914, 944, respectively, via the communications component 940. The devices 910, 950 may be internal or external to the device 920 as desired for a given implementation. The device 920 may implement the sharing management component 520 and remote proxy component 320 of the sharing authority 110. The devices 810, 850 may comprise mobile devices using the sharing authority 110. The devices 810, 850 may comprise server devices accessed by mobile devices using the remote proxy component 320 as a proxy. The signals 914, 944 may comprise communication between mobile devices and the sharing authority 110 and communication between a mobile device and a network server 190 where the remote proxy 320 is used as a proxy for the mobile device.

Figure 10:
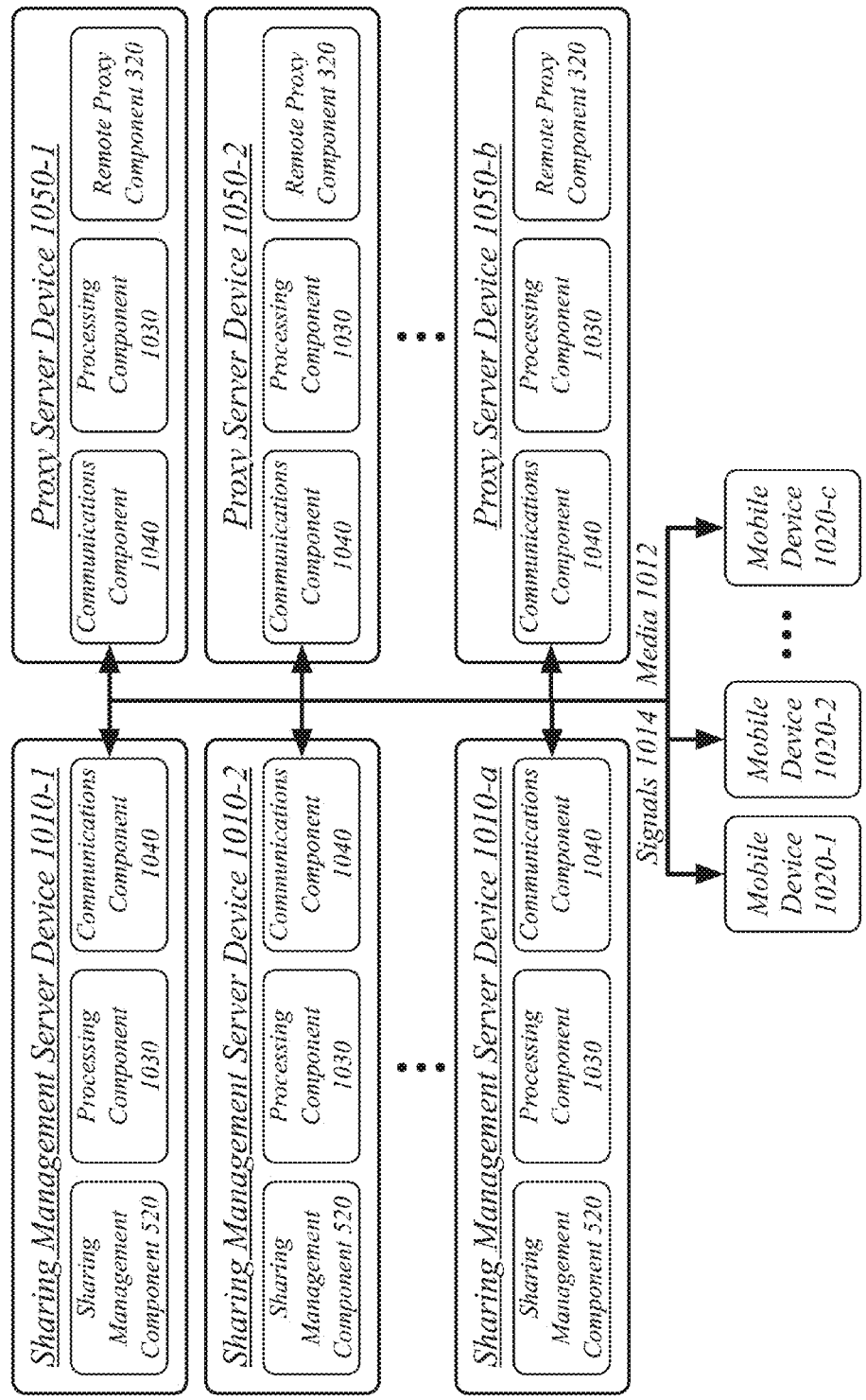
FIG. 10 illustrates an embodiment of a distributed system for the system of FIG. 1.

FIG. 10 illustrates a block diagram of a distributed system 1000. The distributed system 1000 may distribute portions of the structure and/or operations for the peer-to-peer network sharing system 100 across multiple computing entities. Examples of distributed system 1000 may include without limitation a client-server architecture, a S-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise one or more sharing management server devices 1010 and one or more proxy server devices 1050. In general, the one or more sharing management server devices 1010 and the one or more proxy server devices 1050 may be the same or similar to the device 920 as described with reference to FIG. 9. For instance, the one or more sharing management server devices 1010 and the one or more proxy server devices 1050 may each comprise a processing component 1030 and a communications component 1040 which are the same or similar to the processing component 930 and the communications component 940, respectively, as described with reference to FIG. 9. In another example, the devices 1010, 1050 may communicate over a communications media 1012 using communications signals 1014 via the communications components 1040.

The one or more sharing management server devices 1010 may comprise or employ one or more programs that operate to perform various methodologies in accordance with the described embodiments. In one embodiment, for example, the one or more sharing management server devices 1010 may implement the sharing management component 520. The one or more proxy server devices 1050 may comprise or employ one or more programs that operate to perform various methodologies in accordance with the described embodiments. In one embodiment, for example, the one or more proxy server devices 1050 may implement the remote proxy component 320. The signals 1014 may comprise interoperation between the sharing management components 520, the remote proxy components 320, mobile devices 1020 serviced by the sharing authority 110, and one or more network servers accessed by the mobile devices 1020 using the proxy server devices 1050 as proxies.

Figure 11:
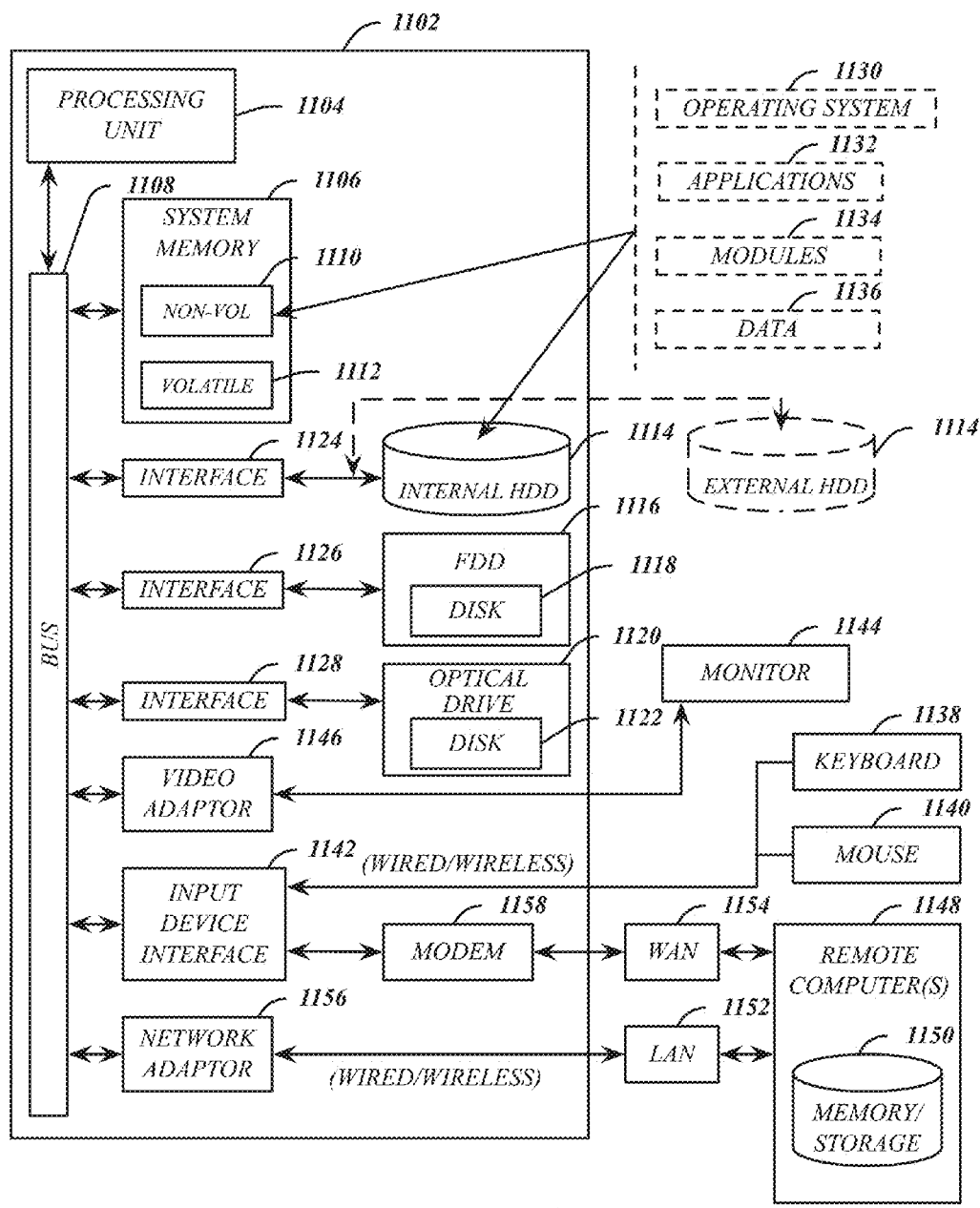
FIG. 11 illustrates an embodiment of a computing architecture.

FIG. 11 illustrates an embodiment of an exemplary computing architecture 1100 suitable for implementing various embodiments as previously described. In one embodiment, the computing architecture 1100 may comprise or be implemented as part of an electronic device. Examples of an electronic device may include those described with reference to FIG. 9 and FIG. 10, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors.

Dual microprocessors, multi-core processors, and other multi-processor architectures may also be employed as the processing unit 1104.

The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures. Interface adapters may connect to the system bus 1108 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1100 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal (or external) hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136. In one embodiment, the one or more application programs 1132, other program modules 1134, and program data 1136 can include, for example, the various applications and/or components of the peer-to-peer network sharing system 100.

A user can enter commands and information into the computer 1102 through one or more wire/wireless input devices, for example, a keyboard 1138 and a pointing device, such as a mouse 1140. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, and so forth.

A monitor 1144 or other type of display device is also connected to the system bus 1108 via an interface, such as a video adaptor 1146. The monitor 1144 may be internal or external to the computer 1102. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 12:
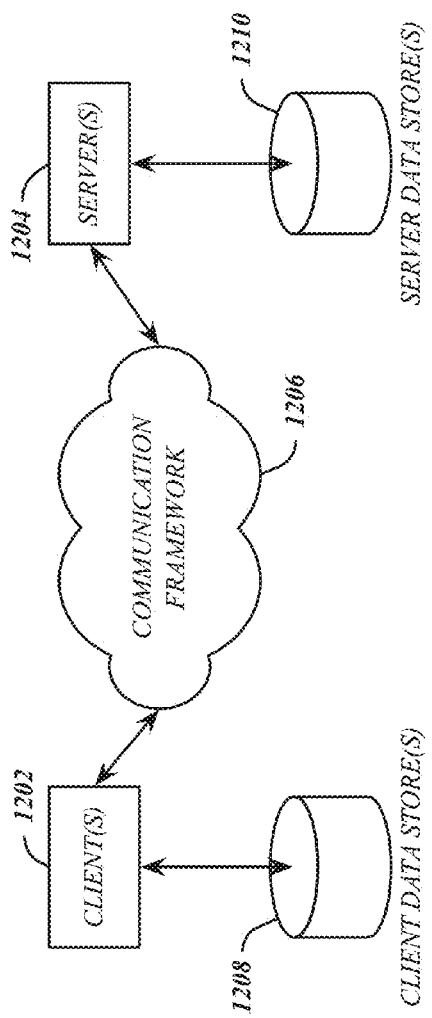
FIG. 12 illustrates an embodiment of a communications architecture.

FIG. 12 illustrates a block diagram of an exemplary communications architecture 1200 suitable for implementing various embodiments as previously described. The communications architecture 1200 includes various common communications elements, such as a transmitter, receiver, transceiver, radio, network interface, baseband processor, antenna, amplifiers, filters, power supplies, and so forth. The embodiments, however, are not limited to implementation by the communications architecture 1200.

As shown in FIG. 12, the communications architecture 1200 comprises includes one or more clients 1202 and servers 1204. The clients 1202 may implement the mobile devices 120, 130, 1020. The servers 1204 may implement the server devices 920, 1010, 1050. The clients 1202 and the servers 1204 are operatively connected to one or more respective client data stores 1208 and server data stores 1210 that can be employed to store information local to the respective clients 1202 and servers 1204, such as cookies and/or associated contextual information.

The clients 1202 and the servers 1204 may communicate information between each other using a communication framework 1206. The communications framework 1206 may implement any well-known communications techniques and protocols. The communications framework 1206 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1206 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1202 and the servers 1204. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 13:
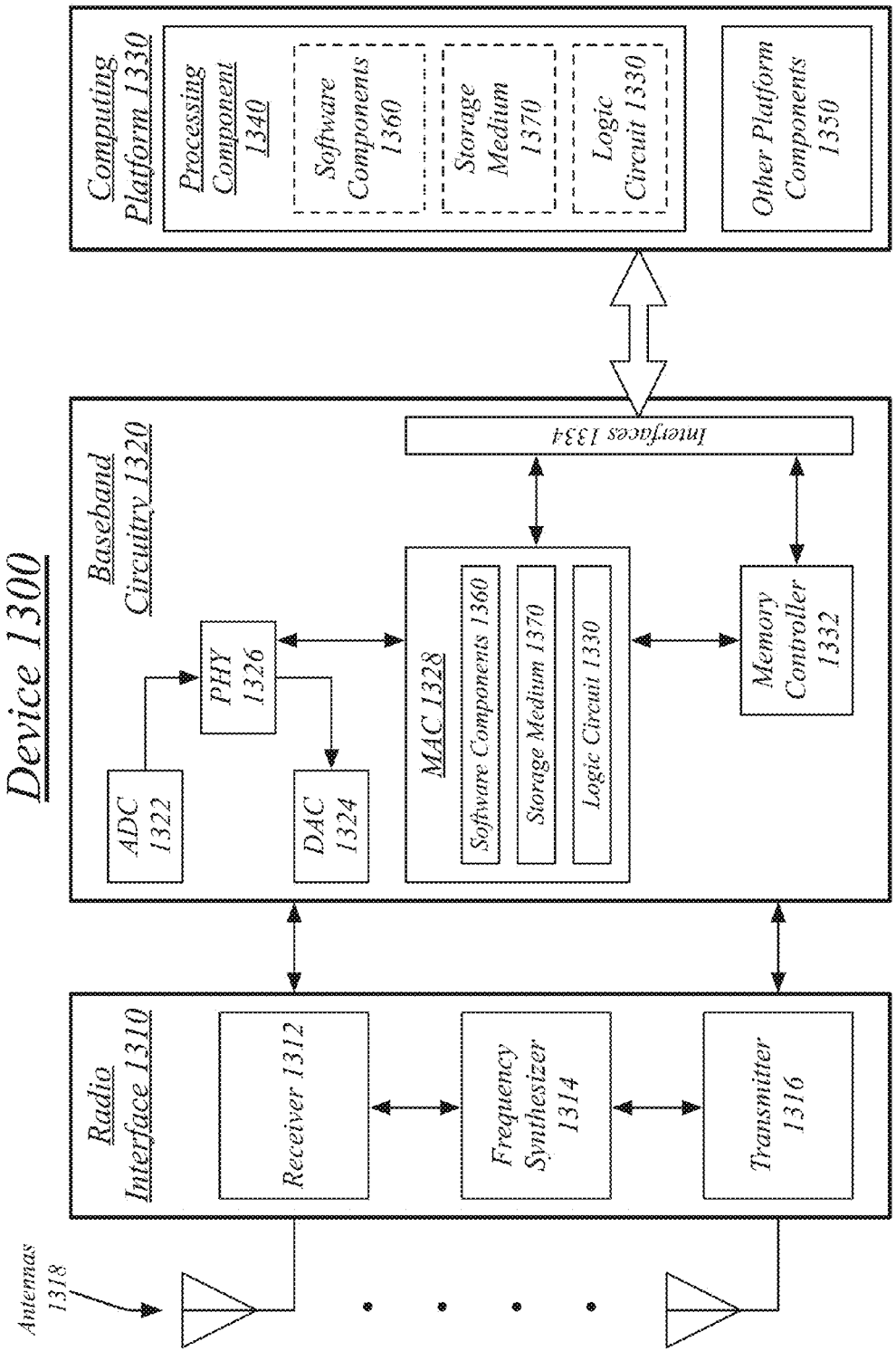
FIG. 13 illustrates an embodiment of a radio device architecture.

FIG. 13 illustrates an embodiment of a device 1300 for use in a multicarrier OFDM system, such as the peer-to-peer network sharing system 100. Device 1300 may implement, for example, software components 1360 as described with reference to peer-to-peer network sharing system 100 and/or a logic circuit 1330. Device 1300 may correspond to the mobile devices 120, 130, 1020. The logic circuit 1330 may include physical circuits to perform operations described for the peer-to-peer network sharing system 100. As shown in FIG. 13, device 1300 may include a radio interface 1310, baseband circuitry 1320, and computing platform 1330, although embodiments are not limited to this configuration.

The device 1300 may implement some or all of the structure and/or operations for the peer-to-peer network sharing system 100 and/or logic circuit 1330 in a single computing entity, such as entirely within a single device. Alternatively, the device 1300 may distribute portions of the structure and/or operations for the peer-to-peer network sharing system 100 and/or logic circuit 1330 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1310 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1310 may include, for example, a receiver 1312, a transmitter 1316 and/or a frequency synthesizer 1314. Radio interface 1310 may include bias controls, a crystal oscillator and/or one or more antennas 1318. In another embodiment, radio interface 1310 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1320 may communicate with radio interface 1310 to process receive and/or transmit signals and may include, for example, an analog-to-digital converter 1322 for down converting received signals, a digital-to-analog converter 1324 for up converting signals for transmission. Further, baseband circuitry 1320 may include a baseband or physical layer (PHY) processing circuit 1356 for PHY link layer processing of respective receive/transmit signals. Baseband circuitry 1320 may include, for example, a processing circuit 1328 for medium access control (MAC)/data link layer processing. Baseband circuitry 1320 may include a memory controller 1332 for communicating with processing circuit 1328 and/or a computing platform 1330, for example, via one or more interfaces 1334.

In some embodiments, PHY processing circuit 1326 may include a frame construction and/or detection module, in combination with additional circuitry such as a buffer memory, to construct and/or deconstruct communication frames, such as radio frames. Alternatively or in addition, MAC processing circuit 1328 may share processing for certain of these functions or perform these processes independent of PHY processing circuit 1326. In some embodiments, MAC and PHY processing may be integrated into a single circuit.

The computing platform 1330 may provide computing functionality for the device 1300. As shown, the computing platform 1330 may include a processing component 1340. In addition to, or alternatively of, the baseband circuitry 1320, the device 1300 may execute processing operations or logic for the peer-to-peer network sharing system 100 and logic circuit 1330 using the processing component 1340. The processing component 1340 (and/or PHY 1326 and/or MAC 1328) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1330 may further include other platform components 1350. Other platform components 1350 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1300 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1300 described herein, may be included or omitted in various embodiments of device 1300, as suitably desired. In some embodiments, device 1300 may be configured to be compatible with protocols and frequencies associated one or more of the 3GPP LTE Specifications and/or IEEE 1302.16 Standards for WMANs, and/or other broadband wireless networks, cited herein, although the embodiments are not limited in this respect.

Embodiments of device 1300 may be implemented using single input single output (SISO) architectures. However, certain implementations may include multiple antennas (e.g., antennas 1318) for transmission and/or reception using adaptive antenna techniques for beamforming or spatial division multiple access (SDMA) and/or using MIMO communication techniques.

The components and features of device 1300 may be implemented using any combination of discrete circuitry, application specific integrated circuits (ASICs), logic gates and/or single chip architectures. Further, the features of device 1300 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1300 shown in the block diagram of FIG. 13 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise transmitting an offer from a first mobile device to a second mobile device for the second mobile device to act as a proxy for the first mobile device for the performance of network services in return for a transfer of sharing credit from a first account to a second account with a sharing authority, the first account associated with the first mobile device, the second account associated with the second mobile device; receiving an offer acceptance from the second mobile device; receiving configuration information; and configuring the first mobile device to use the second mobile device as a network proxy using the configuration information.

A computer-implemented method may comprise the offer acceptance received from the second mobile device in response to a prediction by the second mobile device that a cellular data allocation for cellular data service for the second mobile device has excess capacity for an allocation period.

A computer-implemented method may comprise authorizing the transfer of sharing credit from the first account to the second account with the sharing authority using security credentials for the first account.

A computer-implemented method may comprise the sharing credit generated with the sharing authority based on a previous session of the first mobile device, wherein the first mobile device provided network proxy services to a third mobile device in the previous session.

A computer-implemented method may comprise querying the sharing authority for a reliability rating of the second account; and receiving the reliability rating of the second account from the sharing authority, the reliability rating representing a reliability of a user of the second account in providing proxy services.

A computer-implemented method may comprise the reliability rating generated at least in part based on social-networking information for the user of the second account from a social-networking service.

A computer-implemented method may comprise the reliability rating received by the first mobile device from the second mobile device over a peer-to-peer connection, the reliability rating digitally signed by the sharing authority to verify the sharing authority as source of the reliability rating.

A computer-implemented method may comprise displaying the reliability rating to a user of the first device in association with a notification of available sharing services; and receiving a user selection to initiate the available sharing services.

A computer-implemented method may comprise querying the second account for a sharing credit amount asked for acting as the proxy; displaying the sharing credit amount asked to a user of the first device in association with a notification of available sharing services; and receiving a user selection to initiate the available sharing services.

A computer-implemented method may comprise receiving a proxy availability notification for the second mobile device from the sharing authority at the first mobile device, the proxy availability notification comprising connection information for transmitting the offer to the second mobile device.

A computer-implemented method may comprise the second mobile device selected according to an available amount of cellular data allocation for a cellular data account for the second mobile device.

A computer-implemented method may comprise determining that a cellular data allocation for a cellular data account for the first mobile device is below a threshold amount; and displaying a notification of available sharing services to a user of the first mobile device in response to determining that the cellular data allocation for the cellular data account for the first mobile device is below the threshold amount.

A computer-implemented method may comprise determining that the first mobile device does not have a cellular data allocation for a geographic region in which the first mobile device is operating; and displaying a notification of available sharing services to a user of the first mobile device in response to determining that the first mobile device does not have the cellular data allocation for the geographic region in which the first mobile device is operating.

A computer-implemented method may comprise determining that the second mobile device has a higher-quality network connection available than the first mobile device; and displaying a notification of available sharing services to a user of the first mobile device in response to determining that the second mobile device has the higher-quality network connection available.

A computer-implemented method may comprise wherein using the second mobile device as the proxy comprises at least one of connecting to a Wi-Fi hotspot created by the second mobile device, creating the Wi-Fi hotspot at the first mobile device for the second mobile device to connect to, creating a direct Wi-Fi connection between the first mobile device and the second mobile device, and creating a Bluetooth connection between the first mobile device and the second mobile device.

A computer-implemented method may comprise the offer transmitted as part of an auction held for a receipt of network proxy services from the second mobile device.

An example apparatus may comprise a processor circuit on a first mobile device; a sharing control component operative on the processor circuit to transmit an offer from the first mobile device to a second mobile device for the second mobile device to act as a proxy for the first mobile device for the performance of network services in return for a transfer of sharing credit from a first account to a second account with a sharing authority, the first account associated with the first mobile device, the second account associated with the second mobile device, and receive an offer acceptance from the second mobile device; and a local proxy component operative on the processor circuit to receive configuration information and configure the first mobile device to use the second mobile device as a network proxy using the configuration information. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:

transmitting an offer from a first mobile device to a second mobile device, the offer comprising a request for the second mobile device to act as a proxy for the first mobile device for the performance of network services and an amount of sharing credits to be transferred from a first account to a second account with a sharing authority when the network services are performed, the first account associated with the first mobile device, the second account associated with the second mobile device;

receiving an offer acceptance from the second mobile device;

receiving configuration information; and configuring the first mobile device to use the second mobile device as a network proxy using the configuration information.

2. The method of claim 1, the sharing credit generated with the sharing authority based on a previous session of the first mobile device, wherein the first mobile device provided network proxy services to a third mobile device in the previous session.

3. The method of claim 1, further comprising:

querying the sharing authority for a reliability rating of the second account; and receiving the reliability rating of the second account from the sharing authority, the reliability rating representing a reliability of a user of the second account in providing proxy services.

4. The method of claim 1, further comprising:

querying the second account for a sharing credit amount asked for acting as the proxy;

displaying the sharing credit amount asked to a user of the first device in association with a notification of available sharing services; and receiving a user selection to initiate the available sharing services.

5. The method of claim 1, further comprising:

determining that a cellular data allocation for a cellular data account for the first mobile device is below a threshold amount; and displaying a notification of available sharing services to a user of the first mobile device in response to determining that the cellular data allocation for the cellular data account for the first mobile device is below the threshold amount.

6. The method of claim 1, further comprising:

determining that the first mobile device does not have a cellular data allocation for a geographic region in which the first mobile device is operating; and displaying a notification of available sharing services to a user of the first mobile device in response to determining that the first mobile device does not have the cellular data allocation for the geographic region in which the first mobile device is operating.

7. The method of claim 1, further comprising:

determining that the second mobile device has a higher-quality network connection available than the first mobile device; and displaying a notification of available sharing services to a user of the first mobile device in response to determining that the second mobile device has the higher-quality network connection available.

8. The method of claim 1, wherein using the second mobile device as the proxy comprises at least one of connecting to a Wi-Fi hotspot created by the second mobile device, creating the Wi-Fi hotspot at the first mobile device for the second mobile device to connect to, creating a direct Wi-Fi connection between the first mobile device and the second mobile device, and creating a Bluetooth connection between the first mobile device and the second mobile device.

9. The method of claim 1, the offer transmitted as part of an auction held for a receipt of network proxy services from the second mobile device.

10. An apparatus, comprising:
a processor circuit on a first mobile device;
a sharing control component operative on the processor circuit to transmit an offer from the first mobile device to a second mobile device, the offer comprising a request for the second mobile device to act as a proxy for the first mobile device for the performance of network services and an amount of sharing credits to be transferred from a first account to a second account with a sharing authority when the network services are performed, the first account associated with the first mobile device, the second account associated with the second mobile device, and receive an offer acceptance from the second mobile device; and
a local proxy component operative on the processor circuit to receive configuration information and configure the first mobile device to use the second mobile device as a network proxy using the configuration information.

11. The apparatus of claim 10, the sharing credit generated with the sharing authority based on a previous session of the first mobile device, wherein the first mobile device provided network proxy services to a third mobile device in the previous session.

12. The apparatus of claim 10, further comprising:
the sharing component operative to query the sharing authority for a reliability rating of the second account and receive the reliability rating of the second account from the sharing authority, the reliability rating representing a reliability of a user of the second account in providing proxy services.

13. The apparatus of claim 10, further comprising:
the sharing component operative to query the second account for a sharing credit amount asked for acting as the proxy, display the sharing credit amount asked to a user of the first device in association with a notification of available sharing services, and receive a user selection to initiate the available sharing services.

14. The apparatus of claim 10, further comprising:
the sharing component operative to display a notification of available sharing services to a user of the first mobile device in response to determining at least one of that a cellular data allocation for a cellular data account for the first mobile device is below a threshold amount, that the first mobile device does not have the cellular data allocation for a geographic region in which the first mobile device is operating, and that the second mobile device has a higher-quality network connection available than the first mobile device.

15. The apparatus of claim 10, the offer transmitted as part of an auction held for a receipt of network proxy services from the second mobile device.

16. At least one non-transitory computer-readable storage medium comprising instructions that, when executed, cause a system to:
transmit an offer from a first mobile device to a second mobile device, the offer comprising a request for the second mobile device to act as a proxy for the first mobile device for the performance of network services and an amount of sharing credits to be transferred from a first account to a second account with a sharing authority when the network services are performed, the first account associated with the first mobile device, the second account associated with the second mobile device;
receive an offer acceptance from the second mobile device; and
receive configuration information and configure the first mobile device to use the second mobile device as a network proxy using the configuration information.

17. The computer-readable storage medium of claim 16, the sharing credit generated with the sharing authority based on a previous session of the first mobile device, wherein the first mobile device provided network proxy services to a third mobile device in the previous session.

18. The computer-readable storage medium of claim 16, comprising further instructions that, when executed, cause a system to:
query the sharing authority for a reliability rating of the second account; and
receive the reliability rating of the second account from the sharing authority, the reliability rating representing a reliability of a user of the second account in providing proxy services.

19. The computer-readable storage medium of claim 16, comprising further instructions that, when executed, cause a system to:
query the second account for a sharing credit amount asked for acting as the proxy;
display the sharing credit amount asked to a user of the first device in association with a notification of available sharing services; and
receive a user selection to initiate the available sharing services.

20. The computer-readable storage medium of claim 16, comprising further instructions that, when executed, cause a system to:
display a notification of available sharing services to a user of the first mobile device in response to determining at least one of that a cellular data allocation for a cellular data account for the first mobile device is below a threshold amount, that the first mobile device does not have the cellular data allocation for a geographic region in which the first mobile device is operating, and that the second mobile device has a higher-quality network connection available than the first mobile device.

* * * * *